(No Model.)　　　　　W. BUTTERFIELD.　　　3 Sheets—Sheet 2.
REEL RAKE FOR REAPERS.
No. 578,719.　　　　　　　　　　Patented Mar. 16, 1897.
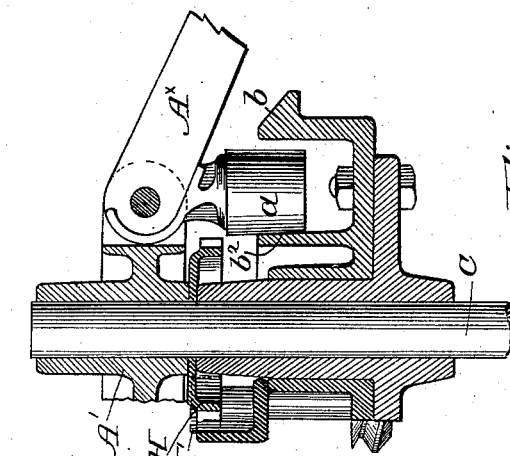
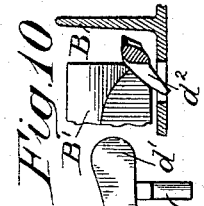
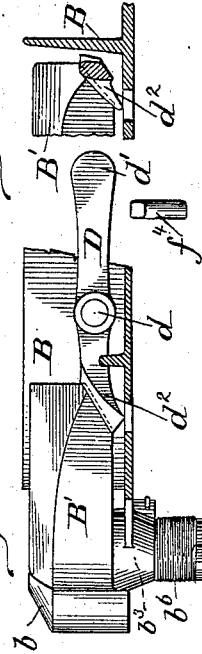
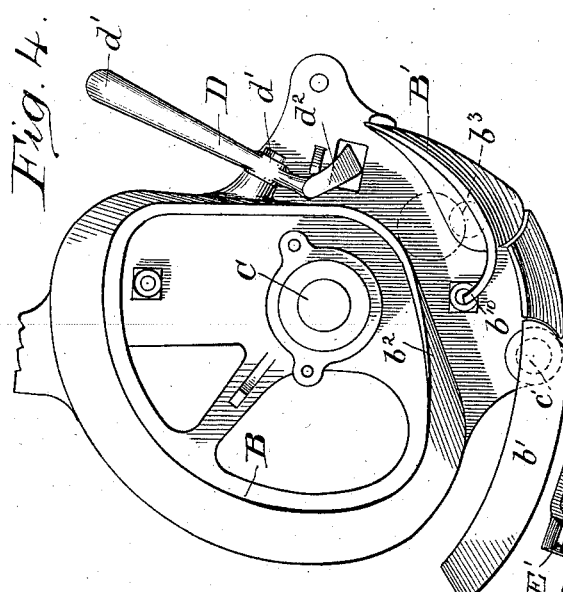
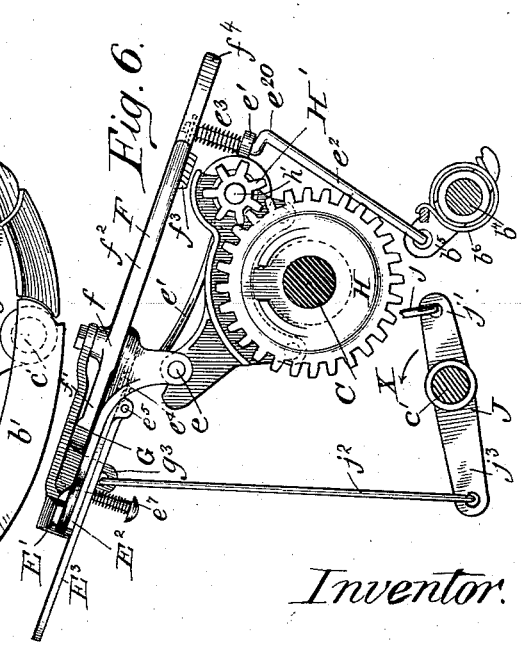
Witnesses
Arthur Johnson
Chas. A. Steward
Inventor
William Butterfield

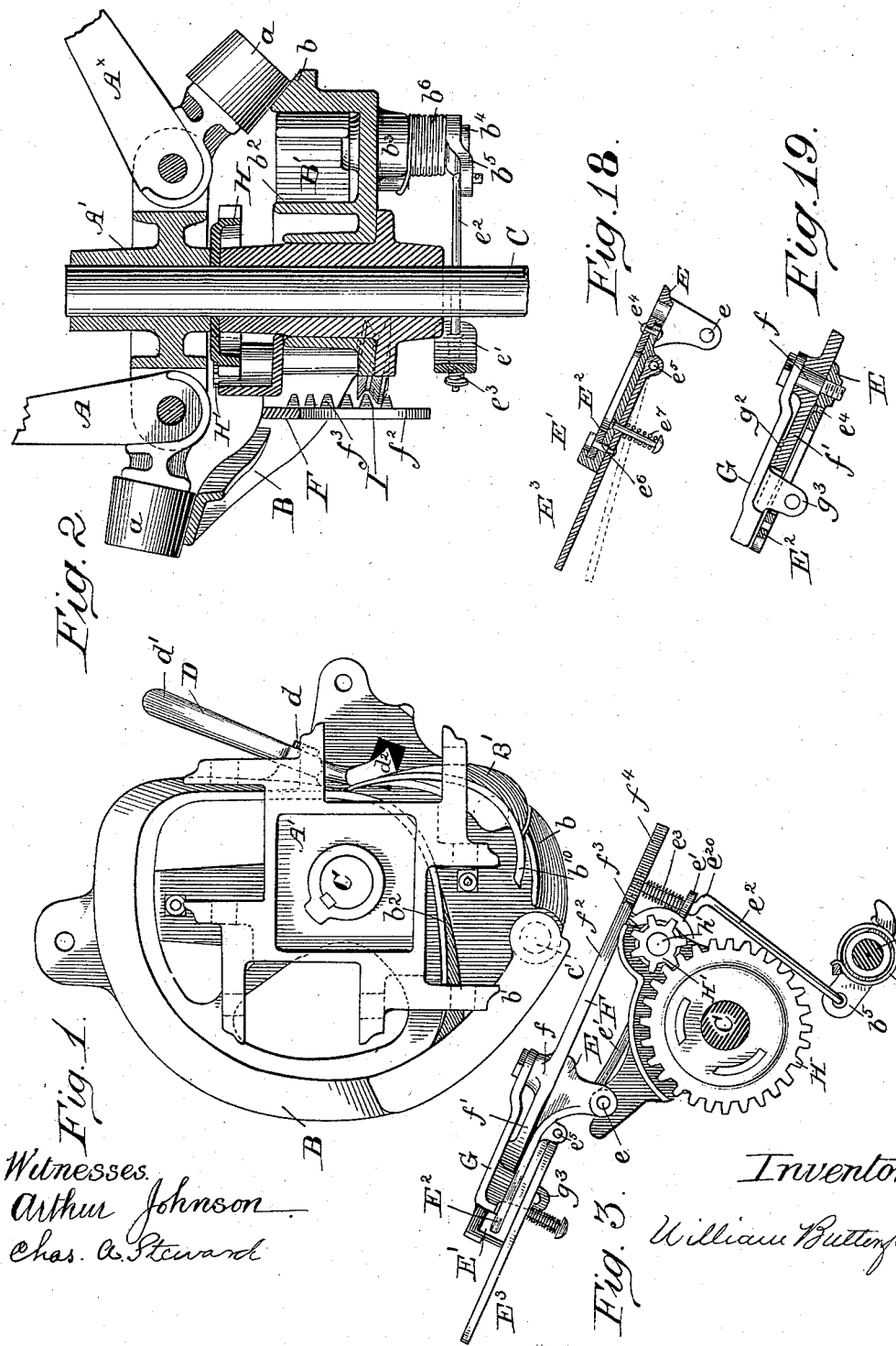

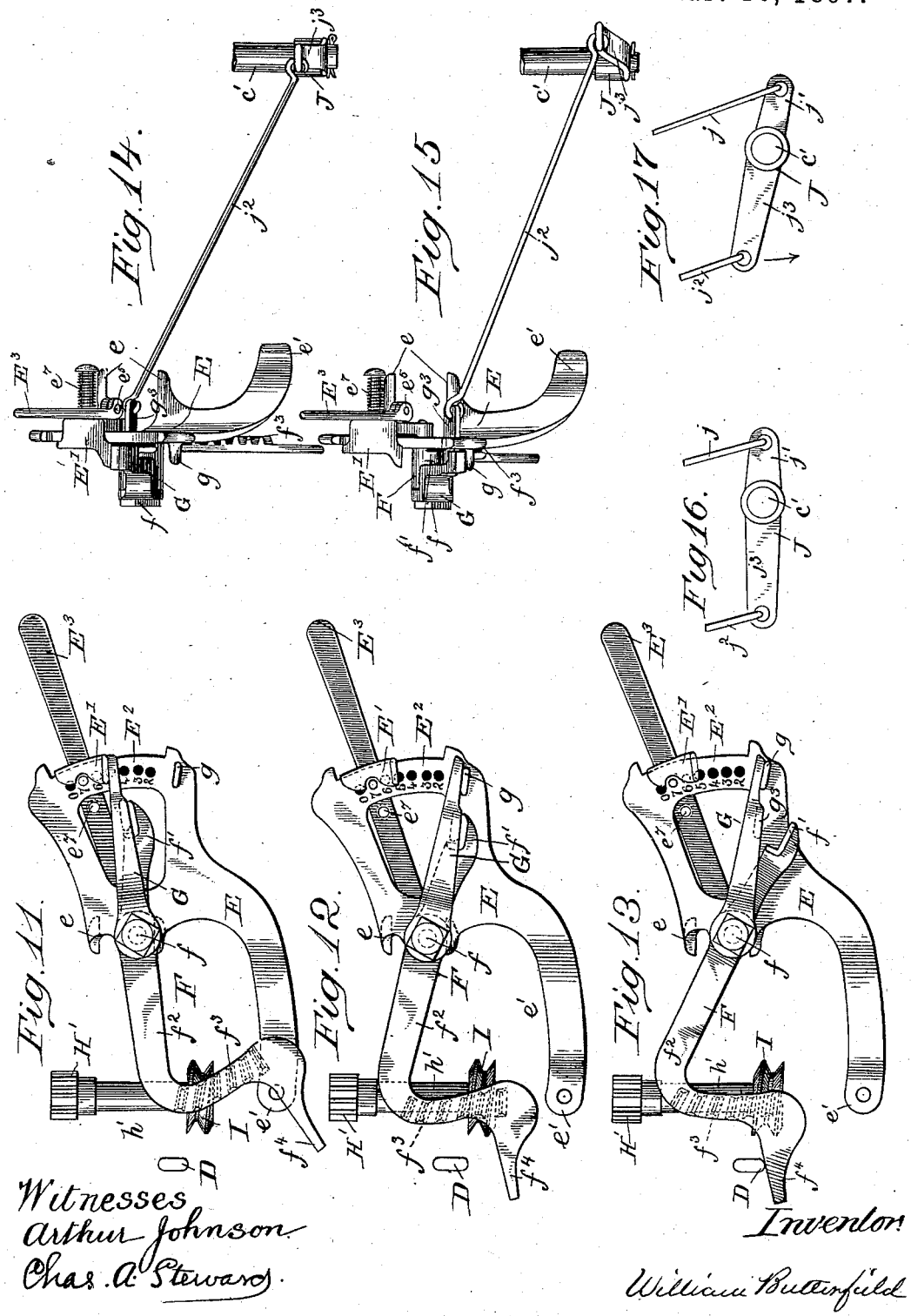

UNITED STATES PATENT OFFICE.

WILLIAM BUTTERFIELD, OF CHICAGO, ILLINOIS, ASSIGNOR TO THE DEERING HARVESTER COMPANY, OF SAME PLACE.

REEL-RAKE FOR REAPERS.

SPECIFICATION forming part of Letters Patent No. 578,719, dated March 16, 1897.

Application filed January 20, 1896. Serial No. 576,053. (No model.)

*To all whom it may concern:*

Be it known that I, WILLIAM BUTTERFIELD, of Chicago, in the County of Cook and State of Illinois, have invented certain new and useful Improvements in Reel-Rakes for Reapers, of which the following is a clear description, reference being had to the accompanying drawings, in which—

Figure 1 is a plan view of the rake-head and cam of a reaper. Fig. 2 is a sectional elevation. Fig. 3 is a plan view of the switch-controlling devices. Fig. 4 is a plan view of the cam with the switch thrown open. Fig. 5 is a sectional elevation showing the position of the rake-arm upon the cam when raking the platform. Fig. 6 is a plan view of the switch-controlling devices shown in the position that they occupy when the switch has been thrown to the position shown in Fig. 4. Figs. 7, 8, 9, and 10 are details of the switch and switch-latch. Figs. 11, 12, and 13 are side elevations of the switch-controlling mechanism. Figs. 14, 15, 16, and 17 are detail views of the switch-controlling mechanism and the devices for actuating them by means of a foot-lever. Figs. 18 and 19 are details of the switch-controlling devices.

The object of my invention is to provide a switch-controlling device for reapers that can be operated at will and that can be set to make every second, every third, every fourth, every fifth, every sixth, or every seventh rake-arm serve as a rake and sweep the grain from the platform.

The drawings only show such parts of a reaper as will make my invention clear, and reference may be had to my recent patent, No. 533,944, granted February 12, 1895, in order to locate the position of the mechanism illustrated and described herein.

The rake-arms A, preferably four in number, are pivoted in the rake-head A' on substantially horizontal axes. They have the usual antifriction-rollers $a$, which track upon and by means of which the movements of the rake-arms are controlled by the cam B as they revolve thereover.

It will be understood hereinafter that the pivotal casting to which the rake-arm proper is secured, the said rake-arm (usually of wood) and the antifriction-roller will be considered as one piece and designated as the "rake-arm." As is well known, the rake-arms of a self-raking reaper have a double function, one to reel the grain to the cutter-bar and the other to rake the grain from the platform. They are pivoted, as before described, upon the rake-head, which rake-head is secured to the upper end of a shaft C, which is given rotation from the main gearing of a reaper by any convenient means. The angle that the rake-arms assume relative to the platform of a reaper is determined by the cam B, which has a double track and a switch, both of which so operate upon the antifriction terminations of the rake-arms as to either raise the said rake-arms away from the platform as soon as they pass the cutter-bar or to keep the rakes in a substantially horizontal position to sweep the grain off the platform.

When the switch B' is in the position shown in Fig. 1, (which position will be hereinafter described as the "closed" position,) the rake-arms will be raised from the platform after passing over the cutting apparatus, because they will track upon the outside of the switch, the supplementary-cam surface $b$, and the bridge $b'$, which connects the said supplementary cam to the main cam B. This will be understood by referring to Fig. 2, where the roller of the rake-arm $A^\times$ is shown as tracking upon the supplementary cam $b$, thus holding the rake away from the platform. In Fig. 4 the switch B' is shown in its open position, and in Fig. 5 the roller of the rake-arm $A^\times$ is shown as tracking upon the wall $b^2$ of the cam B, having passed on the inside of the switch, which position, it will be understood, is the position of raking the platform.

In order that the machine may handle various conditions of grain, the switch B' of the cam is automatically controlled, so that every second, third, fourth, fifth, sixth, or seventh rake-arm passing over or by the switch may rake the platform.

My invention pertains to automatic devices for so controlling the movement of the switch, which devices will now be described.

The switch B' is pivoted at $b^3$ upon its stem $b^4$. At the lower end of the stem $b^4$ is an arm $b^5$. A spring $b^6$, preferably coiled around the stem $b^4$, exerts its stress to throw the switch to its open position when released by the switch-tripping latch D.

E is a support pivoted at $e$ to a convenient member of the framework upon a substantially vertical axis. It has an arm $e'$, which is connected to the arm $b^5$ by a rod $e^2$, the end of which projects through a hole in the said arm of the lever and is elastically connected thereto by the coiled spring $e^3$. The opposite end of the support E is formed into an indexed quadrant $E^2$, having a series of notches or holes. A stop $E'$ is pivoted at $e^4$ upon the lever E, so as to be adjusted around the quadrant $E^2$. The means used for adjusting this stop is preferably a latch-lever $E^3$, pivoted upon the stop $E'$ at $e^5$ and having the latch $e^6$, which engages the stop $E'$ and the series of holes in the quadrant $E^2$. It is spring-held against the said stop $E^2$ by the spring $e^7$. To disconnect the stop $E'$ from the quadrant, the latch-lever $E^3$ is moved upon its pivot to the dotted position shown in Fig. 18, and an adjustment may be made of the said stop upon said quadrant and the spring-held latch allowed to reconnect the said stop with the said quadrant.

As indicated in Figs. 12, 13, and 14, the location of the stop $E'$ upon the quadrant determines what number of rake-arms shall be switched onto the supplementary cam $b$ before the switch is moved to its open position to allow the succeeding rake-arm to pass between the cam-walls $b$ and $b^2$ and cause the rake carried thereon to sweep the platform. The latch-pin is shown as engaging hole No. 7, which indicates that every seventh rake shall rake the platform, the intervening six operating but as reel-arms.

A lever F (hereinafter known as the "segment-carrying" lever) is pivoted at $f$ upon the support E. It has an arm $f'$, projecting toward the quadrant and frictionally engaging an arm G, pivoted concentrically therewith and adapted to engage the stop $E^2$. For the purpose of making this description clear it may be considered for the present that the arm G and the lever F are as one part and that the stop $g$ (hereinafter to be described) be left off. The purpose for which they are made in two parts being, as it were, a supplementary one, will be hereinafter described. Upon the inner surface of the part $f^2$ of the lever F is a worm-segment $f^3$. The extremity $f^4$ of the part $f^2$ strikes the switch-tripping latch D when raised to the position shown in Fig. 13 and releases the switch.

H is a gear upon the shaft C, which meshes into a pinion H', secured to a spindle $h'$. Upon the lower end of the said spindle H' is a worm I, adapted to engage the segment $f^3$ when the switch B' is in its closed position. The arm $f^2$ of the lever F is preferably weighted, so that when disengaged from the worm I the said lever will rock back upon its pivot until its opposite end strikes the stop $E^2$. When the parts are in the position shown in Figs. 1, 2, and 3, the continued rotation of the shaft C, carrying the rake-arms, will give the worm I rotation and cause it to raise the lever F until the part $f^4$ strikes the trip-finger D, which allows the spring $b^6$ to throw the switch open. The number of revolutions or part of revolutions of the shaft C necessary to raise the lever F to a position in which it strikes the latch is determined by the distance it drops when disengaged from the said worm by the throwing open of the switch. In other words, there being in this instance four rake-arms pivoted upon the rake-head and the latch-pin of the stop $E^2$ engaging the quadrant at the hole or notch No. 7, the speed of the worm I will be such that in one and one-half revolutions of the shaft C the lever F will be raised high enough to strike the trip-latch D, and every seventh rake will sweep the platform. Should the stop be moved down the quadrant to the hole or notch No. 4, for instance, the lever F will not drop so far when the switch is released, and the number of revolutions required in raising the said lever will be equal only to three-quarters of a revolution of the shaft C, and every fourth rake will rake.

The manner in which the segment-lever is moved away from the worm at the time the switch is thrown to its open position will be understood by referring to Figs. 3 and 6. As before described, the rod $e^2$ connects the arm $b^5$ with the arm $e'$. The switch is thrown by the pressure of the spring $b^6$ and the rod $e^2$ by means of its shoulder $e^{20}$ and forces the support E and the parts which are mounted upon it away from the worm.

Referring to Figs. 7, 8, 9, and 10, the switch-latch D is pivoted at $d$ upon the cam B. Its end $d'$, which is struck by the part $f^4$ of the lever F, is preferably made heavier than the arm $d^2$ in order that it may normally hold the switch in its closed position against the stress of the spring $b^6$. The extremity of the arm $d^2$ is beveled, so that when the switch is moved to its closed position the latch D will be rocked upon its pivot by the passing of the switch over it out of the way of the said switch, its weighted arm $d'$ forcing the arm $d^2$ upward as soon as the switch has passed it, as indicated in the figures last mentioned. The striking of the latch D by the lever F causes the arm $d^2$ to move down away from the switch and allows the spring $b^6$ to throw the said switch open. It will be understood that the switch B' is moved to its closed position by the roller of the rake that sweeps the platform striking the arm $b^{10}$ as it passes between the walls $b$ and $b^2$ of the cam.

As before mentioned, and as far as described, the arm G has been considered practically as one part with the arm $f'$ of the lever F, and, taking only the functions of the lever F that have been described into account, the arm G would serve its purpose if made integral with the said arm F', as before described.

The making of the parts F and G in two pieces will be understood when it is known that in using a reaper it is sometimes desirable to trip the switch-controlling devices into immediate action, so that the platform can be raked before the corner of the field is reached, or for some other reason, and again it is sometimes desirable to prevent the switch from being thrown open. To accomplish this, J is a lever loosely pivoted upon the stem $c'$ of the usual cam-bridge $b'$, or it may be pivoted at any convenient place. A rod $j$ is linked to its arm $j'$ and serves to connect it to a convenient foot-lever. (Not shown.) A rod $j^2$ connects the arm $j^3$ of the lever J to the lug $g^3$ of the arm G. Stress applied to the foot-lever, so as to move the lever J upon its pivot in the direction of the arrow X in Fig. 6, will swing the lever E upon its pivot $e$, so as to disengage the segment-lever from the worm, and will, on account of the angle of the rod $j^2$, (see Figs. 14 and 15,) move the lever G down to the position shown in Fig. 12, where it strikes the stop $g$. The stress put upon the foot-lever is then removed, allowing the worm-segment lever to reëngage the worm and to continue its movement to the position shown in Fig. 13, where it strikes the tripping-lever D. By these means and because the worm is "timed" with the rake-head, leaving the arm G resting upon the stop $g$, as in Fig. 12, the switch is prevented from being tripped at the wrong time. It must be understood that the stress put upon the foot-lever, in order to trip the switch at will, must be quickly applied—that is to say, in effect, a blow must be given it, so as to throw the segment-carrying lever up to the position shown in Fig. 12. It cannot be thrown above that position by the foot-lever, because the stop $g$ prevents the further movement downward of the arm G and because the arm G and the lever F are held together tightly by the friction-surface $g^2$, as shown in Fig. 19. The two parts are thus held together, so that any quick sudden movement will not separate them from each other and is also such that when the segment-lever reengages the worm in the position shown in Fig. 12 the said lever F can be carrried upward away from the arm G against the resistance of this friction-surface.

If it is desired to prevent the switch from being tripped, steadily-applied pressure upon the foot-lever will hold the worm-segment lever F away from the worm as long as desired.

The spring $e^3$ is for the purpose of providing a yielding connection between the support E and the switch in order to allow the tripping of the switch-latch, as above described. The spring $e^2$ also serves another useful purpose by providing a yielding engagement between the segment-carrying lever and the worm.

In the claims that cover the automatic devices the segment-lever and the arm G will be considered as one element, because as far as the purely automatic action of the devices is concerned their functions are as the function of one part. It is only when they coöperate with the foot-lever and its connecting mechanism that each of the two parts has a separate function.

What I claim as my invention, and desire to secure by Letters Patent, is—

1. The combination of a series of reel raking-arms adapted to move upon a vertical axis, a cam surrounding said axis for controlling the said arms, said cam provided with a switch which is closed by the said arms and opened at intervals by a spring, a latch by which the said switch is locked in its closed position and by the movement of which it is released when desired, a segment-carrying lever adapted to strike the said latch to release the said switch and to fall back against a stop when said switch is released, a worm rotated at a definite speed relative to the rotation of the said reel raking-arms and adapted to engage the said segment-lever to raise it, supporting mechanism for the said segment-lever adapted to be rocked upon a substantially vertical axis by the opening of the said switch to carry the said lever away from the said worm, and the said stop to limit the fall of the said lever when the said switch is opened, substantially as described.

2. The combination of a series of reel raking-arms adapted to move upon a vertical axis, a cam surrounding said axis for controlling the said arms, said cam provided with a switch which is closed by the said arms and opened at intervals by a spring, a latch by which the said switch is locked in its closed position and by the movement of which it is released when desired, a segment-carrying lever adapted to strike the said latch to release the said switch and to fall back against a stop when said switch is released, suitable gearing rotated at a definite speed relative to the rotation of the said reel raking-arms and adapted to engage the said segment-lever to raise it, supporting mechanism for the said segment-lever adapted to be rocked by the opening of the said switch to rock the said lever away from the said gearing, and the said stop to determine the distance through which the said lever shall fall when the said switch is opened, substantially as described.

3. The combination of a series of reel raking-arms adapted to move upon a vertical axis, a cam surrounding said axis for controlling the said arms, said cam provided with a switch which is closed by the said arms and opened at intervals by a spring, a latch by which the said switch is locked in its closed position and by the movement of which it is released when desired, a segment-carrying lever adapted to strike the said latch to release said switch and to fall back against a stop when said switch is released, a worm rotated at a definite speed relative to the rotation of the said reel raking-arms and adapted to engage the said segment-lever to raise it, supporting mechanism for the said segment-lever adapted to be rocked by the opening of the said switch to carry the said lever away from the said worm, and the said stop adjustably supported upon said supporting mechanism, the adjustability of which determines the point to which the said segment-carrying lever shall fall, substantially as described.

4. The combination of a series of reel raking-arms adapted to move upon a vertical axis, a cam surrounding said axis for controlling the said arms, said cam provided with a switch which is closed by the said arms and opened at intervals by a spring, a latch by which the said switch is locked in its closed position and by the movement of which it is released when desired, a segment-carrying lever adapted to move the said latch to release the said switch and to fall back against an adjustable stop when said switch is released whereby the position to which the said lever shall fall is determined, a worm rotated at a definite speed relative to the rotation of the said reel raking-arms and adapted to engage the said segment-lever to raise it, supporting mechanism for the said segment-carrying lever adapted to be rocked by the opening of the said switch and having an indexed quadrant in which is a series of adjustment-notches and the said stop adjustable upon the said indexed quadrant, substantially as described.

5. The combination of a series of reel raking-arms adapted to move upon a vertical axis, a cam surrounding said axis for controlling the said arms, said cam provided with a switch which is closed by the said arms and opened at intervals by a spring, a latch by which the said switch is locked in its closed position and by the movement of which it is released when desired, a segment-carrying lever adapted to strike the said tripping-lever to release the said switch and to fall back against a stop when said switch is released, a worm rotated at a definite speed relative to the rotation of the said reel raking-arms and adapted to engage the said segment-lever to raise it, supporting mechanism for the said segment-carrying lever adapted to be rocked by the opening of the said switch and having an indexed quadrant in which is a series of adjustment-notches and the said stop adjustable upon the said indexed quadrant, and a spring-held lever to adjust the said stop upon the said quadrant, substantially as described.

6. The combination of a series of reel raking-arms adapted to move upon a vertical axis, a cam surrounding said axis for controlling the said arms, said cam provided with a switch which is closed by the said arms and opened at intervals by a spring, a latch by which said cam-switch is locked in its closed position and by the movement of which it is released when desired, a segment-carrying lever adapted to be raised to strike the said latch to release the said switch and to fall back against a stop when said switch is released, a worm rotated at a definite speed relative to the rotation of the said reel raking-arms, supporting mechanism for the said segment-carrying lever connected by a spring-rod to the said switch, whereby the said segment-carrying lever is rocked away from the said worm when the said switch is opened, the said spring connection providing a yielding engagement between the said segment-carrying lever and the said worm, and the said stop to limit the fall of the said lever when the said switch is opened, substantially as described.

7. The combination of the switch-controlling support, having a quadrant in which is a series of notches, an adjustable stop pivoted thereto, an adjustment-lever carrying a latch to secure the said stop to the said quadrant, the said lever being spring-held against the said stop and pivoted thereon, substantially as described.

8. The combination of the reel raking-arms, their controlling-cam, having a switch, with a latch by which the said cam-switch is locked in its closed position and by the movement of which it is released when desired, a worm, a worm-segment lever adapted to be released by the said worm to move the said latch and to fall back to its initial position when the said switch is released, an adjustable stop against which the said segment-carrying lever falls whereby the adjustability of said stop provides various initial positions of said segment-lever, substantially as described.

9. The combination of the reel raking-arms, the controlling-cam and the switch of a reaper, a latch by which the said cam-switch is locked in its closed position and by the movement of which it is released when desired, a worm rotated at a definite speed relative to the rotation of the said reel raking-arms, a segment-carrying lever actuated by the said worm to strike the said tripping-lever, an arm adapted to follow the said segment-carrying lever as it is moved toward the said tripping-lever, supporting mechanism for the said segment-carrying lever adapted to be rocked upon its pivot to move the said segment-carrying lever away from the said worm, mechanism under the control of the operator, connected to the said arm, whereby the said supporting mechanism is rocked and the said segment-carrying lever is carried to a position near to the said tripping-lever and whereby the said segment-carrying lever is disengaged from the said worm, raised to almost its extreme position and allowed to reëngage the said worm to trip the said switch at a proper time in the rotation of the reel raking-arms and at will, substantially as described.

10. The combination of the reel rake-arms and the cam of a reaper with a worm, a segment-carrying lever actuated by the said worm to raise it to trip the switch, supporting mechanism for the said segment-carrying lever and mechanism under the control of the operator whereby the said supporting mechanism can be rocked to carry the said lever away from its actuating-worm to prevent the switch from being opened, substantially as described.

11. In a switch-controlling device for selfrake reapers, the combination of a lever having a segment, gearing adapted to engage said segment, to raise the said lever, a support for said lever adapted to be rocked to carry the said segment-lever away from said gearing, an arm adapted to raise said lever when the same is disengaged from said gearing, and a lever having a rod connection with said arm and under the control of the operator whereby the said segment-lever can be disengaged from the said gearing and be raised to nearly its extreme position, substantially as described.

WILLIAM BUTTERFIELD.

Witnesses:
ARTHUR JOHNSON,
CHAS. A. STEWARD.